Figure 1:
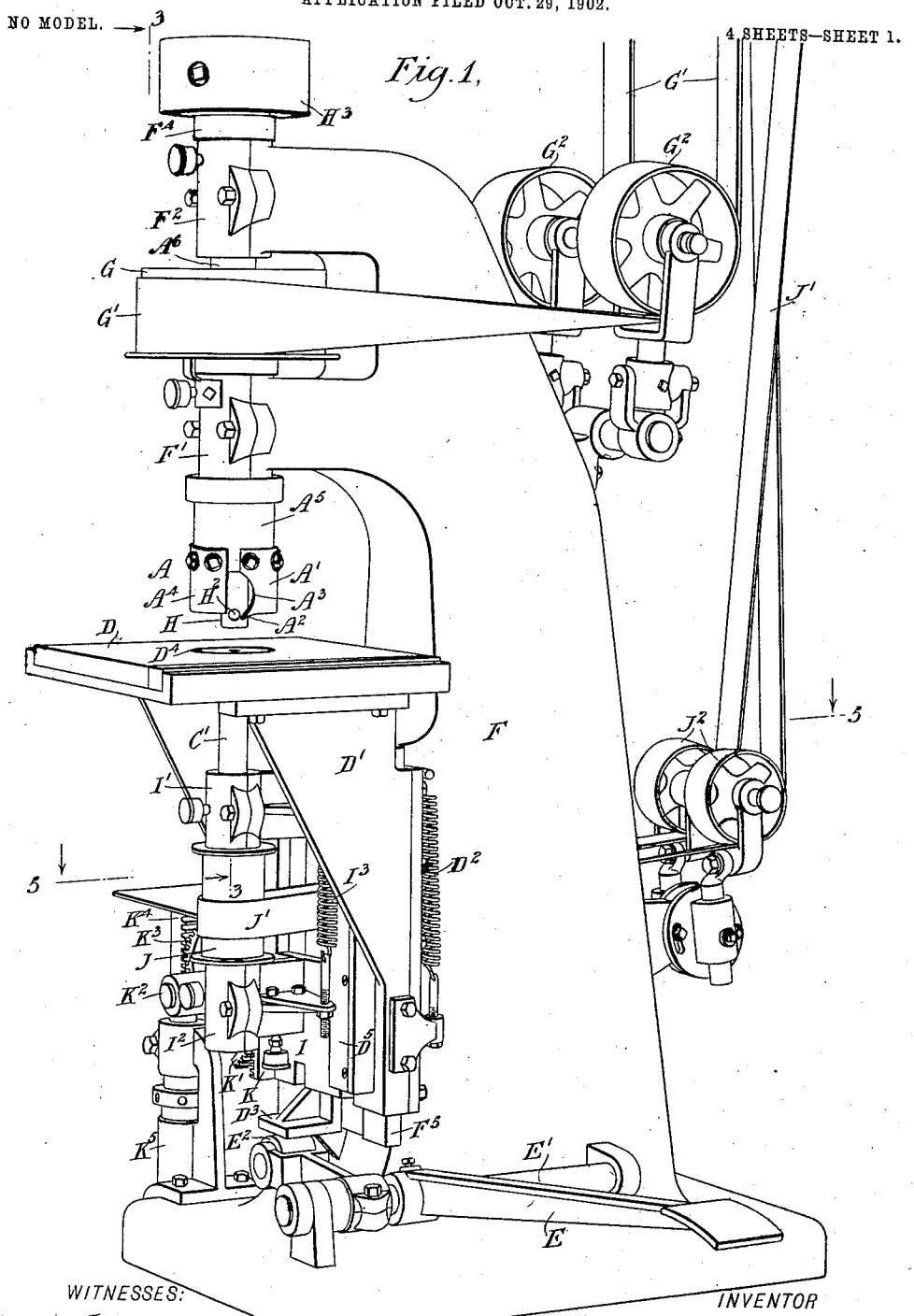

No. 727,320. PATENTED MAY 5, 1903.
G. A. ENSIGN.
MACHINE FOR PRODUCING APERTURED DISKS.
APPLICATION FILED OCT. 29, 1902.
NO MODEL. 4 SHEETS—SHEET 1.

WITNESSES: Edw. Thorpe.

INVENTOR George A. Ensign
BY
ATTORNEYS.

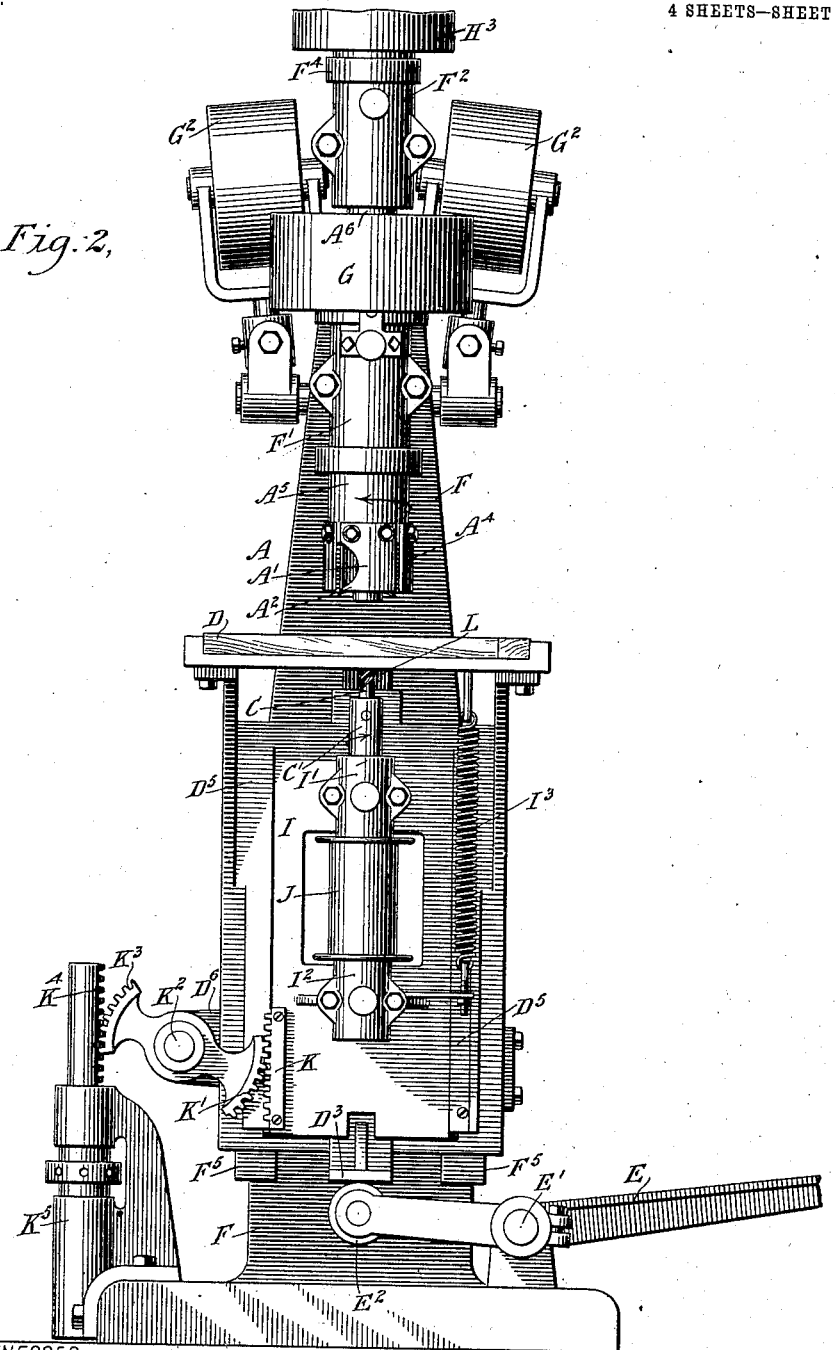

No. 727,320. PATENTED MAY 5, 1903.
G. A. ENSIGN.
MACHINE FOR PRODUCING APERTURED DISKS.
APPLICATION FILED OCT. 29, 1902.
NO MODEL. 4 SHEETS—SHEET 3.
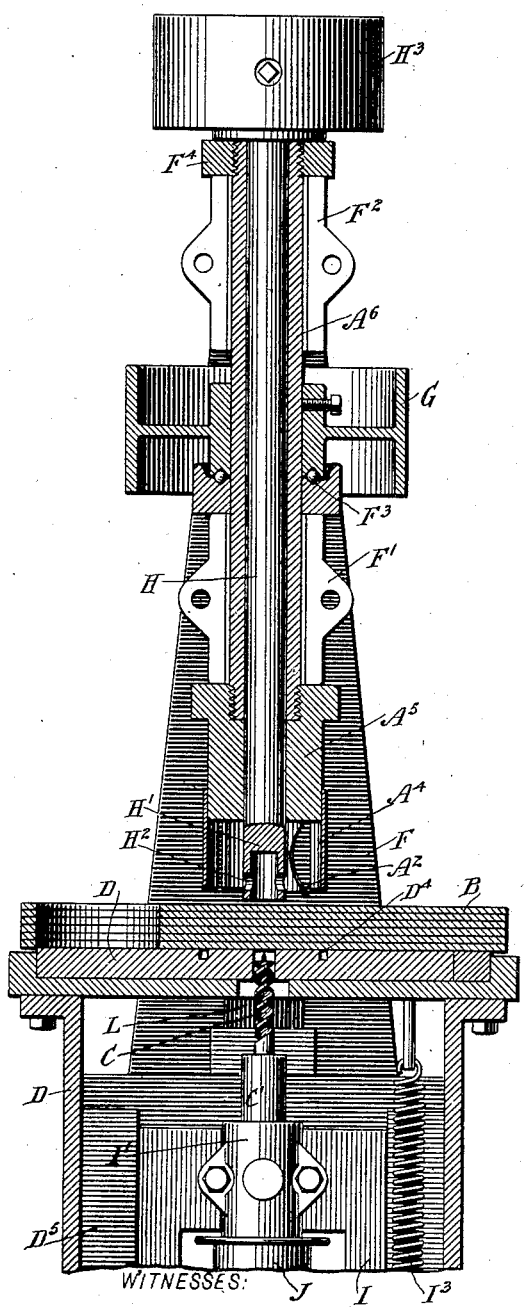
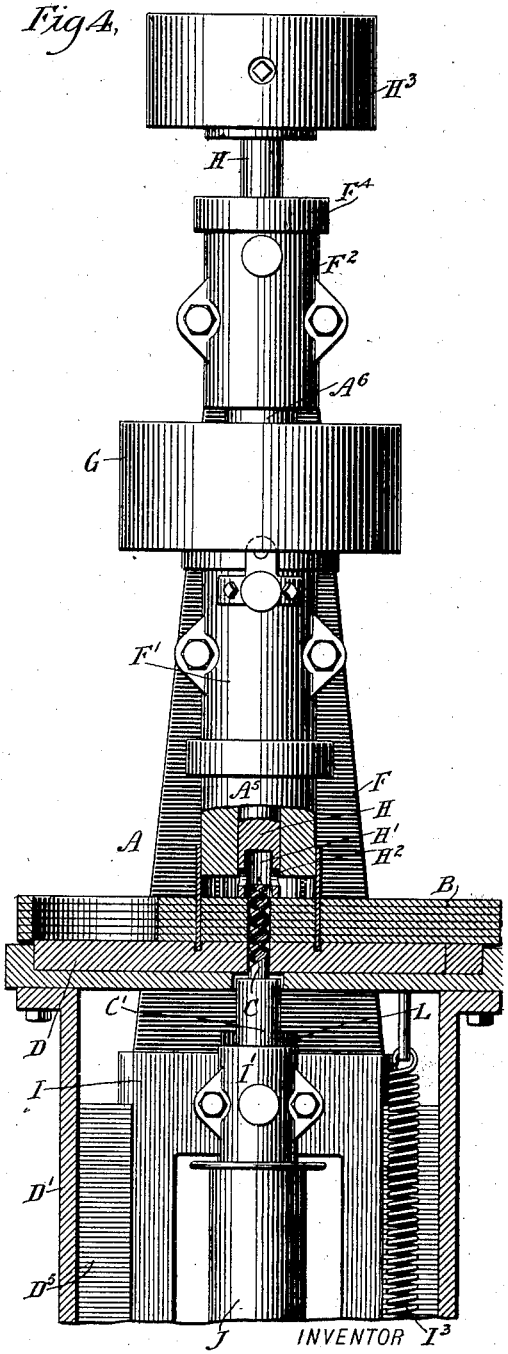
WITNESSES:
Edward Thorpe.
Geo. G. Hoster.
INVENTOR
George A. Ensign
BY
Munn
ATTORNEYS.

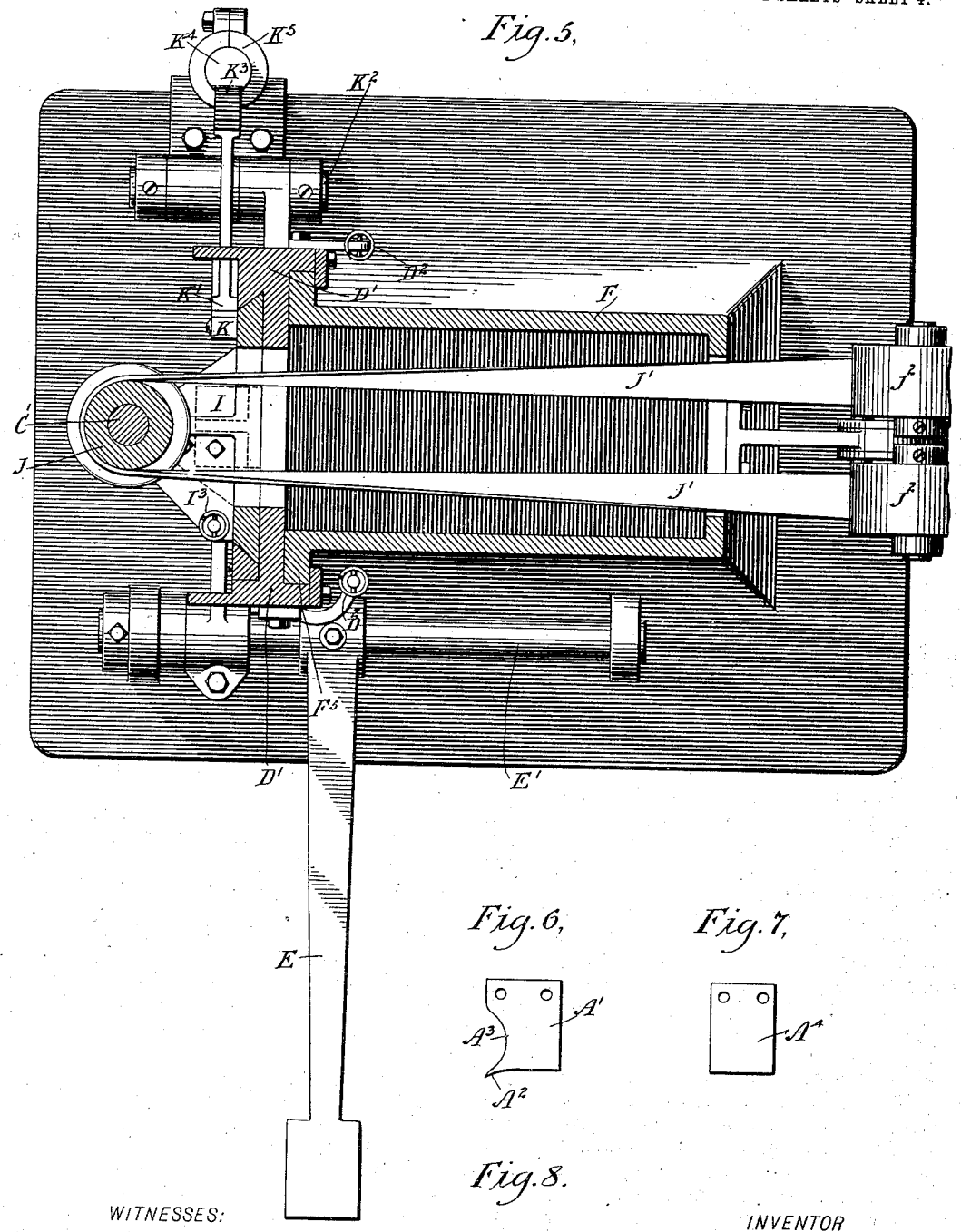

No. 727,320. Patented May 5, 1903.

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

MACHINE FOR PRODUCING APERTURED DISKS.

SPECIFICATION forming part of Letters Patent No. 727,320, dated May 5, 1903.

Application filed October 29, 1902. Serial No. 129,255. (No model.)

*To all whom it may concern:*

Be it known that I, GEORGE A. ENSIGN, a citizen of the United States, and a resident of Defiance, in the county of Defiance and State of Ohio, have invented new and useful Improvements in Machines for Producing Apertured Disks, of which the following is a full, clear, and exact description.

The invention relates to woodworking machinery; and its object is to provide a new and improved machine for producing apertured disks in a very simple and quick manner, the disks produced being accurate in shape and the machine readily operated without the employment of skilled labor.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the figures.

Figure 1 is a perspective view of the improvement. Fig. 2 is a front elevation of the same. Fig. 3 is an enlarged sectional front elevation of the same on the line 3 3 of Fig. 1. Fig. 4 is a similar view of the same, showing the working parts in a different position. Fig. 5 is an enlarged sectional plan view of the improvement on the line 5 5 of Fig. 1. Fig. 6 is a face view of one of the cutter-head blades. Fig. 7 is a like view of one of the spacers for the cutter-head blades, and Fig. 8 is a perspective view of a pile of apertured disks produced by the machine.

In the machine presently to be described in detail use is made of a disk-cutting device, such as a revoluble cutter-head A, for cutting the disk from a piece of wood B, and of a boring device, such as a revoluble auger C, for boring a central aperture in the disk cut by the said disk-cutting device. It is understood that in referring to the piece of wood B in this specification it may be a single piece of wood or a plurality of superposed boards or layers of wood, as indicated in Figs. 3 and 4. In the former case a single apertured disk is cut at each operation, and in the latter case a plurality of superimposed apertured disks B' are produced at each operation, as is hereinafter more fully described.

As shown in the drawings, the cutter-head A operates from the top of the piece of wood B in a downward direction, while the auger C bores upward from underneath, and the cutter-head A and the auger C rotate in opposite directions to equalize as much as possible the lateral strain incident to the cutting and boring operation.

In the operation of the machine the work or piece of wood B is placed on a feed-table D, which is fed upward by the operator pressing a treadle E to feed the piece of wood to the cutter-head A, and at the same time the auger C is fed upward at a higher rate of speed, the feed mechanism for the auger being automatically controlled from the said feed-table D.

In detail the construction is as follows:

The cutter-head A consists of a plurality of spaced cutting-blades A' of segmental shape and each formed at its lower front corner with a forwardly and downwardly extending chisel $A^2$ for cutting the wood, and the front edge above the said chisel is provided with a cut-out portion $A^3$ to allow the chips to readily pass upward and out of the circular groove cut by the chisel into the piece of wood. The segmental cutting-blades A' alternate with segmental spacers $A^4$, traveling in the circular groove and cut by the chisels $A^2$, to steady the cutter-head and to prevent wabbling of the same while cutting the disk, it being understood that the blades A' and spacers $A^4$ are arranged in a circle to insure the production of a perfect circular disk. The blades A' and spacers $A^4$ are bolted or otherwise secured to a hollow cutter-head body $A^5$, screwed on the lower end of the hollow cutter-head spindle $A^6$, journaled in suitable bearings F' $F^2$, located one above the other and held on the main frame F of the machine. On the cutter-head spindle $A^6$ between the bearings F' $F^2$ is secured a pulley G, around which passes a belt G', also passing over guide-pulleys $G^2$ to a pulley on a counter-shaft to rotate the spindle $A^6$, and consequently the cutter-head A. The hub of the pulley G has a ball-bearing connection F³ with the upper end of the bearing F', and the top of the bearing F² is engaged by a collar F⁴, secured to the upper end of the cutter-head spindle A⁶, so as to hold the latter against outward movement in its bearings F' F². (See Fig. 3.)

The feed-table D is preferably in the shape of a block of wood set in the table-frame D', mounted to slide vertically in suitable guideways F⁵, formed on the front of the frame F. Counterbalance-springs D² are held on the frame F and connected with the table-frame D' to counterbalance the latter and the table D to permit an easy upward sliding movement of the table and the work or the piece of wood B on the operator pressing the treadle E. The latter is fulcrumed at E' on the main frame F, and its inner end carries a friction-roller E², engaging the under side of a foot-piece D³, secured or formed on the lower end of the table-frame D', so that when the operator presses the treadle E an upward sliding movement is given to the frame D' and its table D. When the operator releases the presser on the treadle E, the table and its supporting-frame slides back to its lowermost normal position by its own weight. In order to hold the piece of wood firmly down on the table D, a presser device is provided, and this device consists, essentially, of a presser-bar H, mounted to slide loosely in the cutter-head body A⁵ and the spindle A⁶, and the lower end of the said presser-bar H is formed with a central recess H' for the entrance of the upper end of the auger C at the time the latter breaks through the wood at the top thereof. Chips carried upward into the recess H' by the auger C readily pass out of the same through openings H², arranged in the sides of the bar H. On the upper end of the presser-bar H is secured a weight H³ to cause the lower end of the presser-bar to press with the desired force onto the top of the piece of wood. If a single disk is cut from a piece of wood, then the cutter-head and the auger are not liable to break or chip the wood at the time they cut through the wood at the bottom and top thereof, owing to the pressure of the said pressing device, and at the same time the presser device holds the formed disk against reversion, and consequently prevents the disk from binding on the cutter-head or auger. The top of the table D is formed with a circular groove D⁴ for the entrance of the lower end of the cutter-head A, as indicated in Fig. 4. It is understood that during the upward feed of the table D and the piece of wood held thereon the presser-bar H on account of resting on the said piece of wood moves up with the latter and slides freely in the cutter-head body A⁵ and the spindle A⁶.

The auger C is removably held in the upper end of a spindle C', journaled in the bearings I' I², arranged on a slide I, mounted to move vertically in suitable guideways D⁵, arranged on the table-frame D', and the said slide I is hung on a spring I³, attached to the table-frame D'. On the spindle C', between the bearings I' I², is fastened a pulley J, around which passes a belt J', also passing over guide-pulleys J², to then pass in a crossed position to a pulley on a counter-shaft, so that a rotary motion is given to the spindle C' and the auger C, but in a reverse direction to that given to the cutter-head A. In order to feed the slide I upward at the time the table is fed upward by the operator pressing the treadle E, the following device is provided: On the slide I is secured a rack K, in mesh with a segmental gear-wheel K', having its shaft K² journaled in a suitable bearing D⁶, secured or formed on the frame D' for the table D. A segmental gear-wheel K³ extends from the shaft K² in a diametrical direction to the segmental gear-wheel K', and the gear-wheel K³ is in mesh with a rack K⁴, held vertically adjustable by suitable means in a bracket K⁵, attached to the base of the main frame F. Now it is evident that when the table and frame D' is moved upward the shaft K² and its two gear-wheels K' and K³ move bodily with the said table-frame, and as the gear-wheel K³ is in mesh with the fixed rack K⁴ it is evident that a turning motion is given to the gear-wheels K³ K', so that the gear-wheel K' acts on the rack K, and thus moves the latter upward, and with it the slide I, on which the said rack K is fastened. Now the slide I moves bodily with the table-frame, as the slide is hung on the spring I³, attached to the table-frame, and at the same time the slide is caused to move in the guideways D⁵ by the action of the gear described, so that the auger is fed upward faster than the table, and consequently the auger C bores the hole into the wood from underneath at the same time that the cutter-head A cuts into the wood from the top to form the disk.

The operation is as follows: When the table D is in its lowermost position, then the upper end of the auger C is below the top of the table D and within an opening therein, and the cutter-head A is a distance above the table-top to permit the operator to place the piece of wood B into the desired position on the table D, as shown in Fig. 3, and then the operator presses the treadle E to cause an upward sliding of the table D and the auger-carrying slide I, as above explained, to cause the revolving auger to bore the piece of wood from beneath and to bring the piece of wood to the cutter-head A for the latter to cut a circular disk out of the piece of wood. As the cutter-head A and the auger C are in axial alinement, it is evident that the disk formed by the cutter-head is provided with a central aperture bored by the auger. When the cutter-head has cut through the piece of wood at the bottom thereof, the auger has cut through the top of the piece of wood, and then the operator releases the pressure on the treadle E, so that the table D and the auger-carrying slide I move downward by their own weight and the piece of wood moves with the table D, as well as the disk, as the latter is firmly pressed down onto the table by the presser-bar H until shortly after the cutter-head passes out of the cut, it being understood that for the purpose mentioned the lower end of the presser-bar extends normally a short distance down beyond the lower end of the cutter-head, as plainly indicated in Fig. 3. The downward sliding motion of the table-D' is limited by a cushion-block L, of rubber or like material, held on the main frame F.

For producing apertured disks of larger or smaller sizes correspondingly-sized cutter-heads and augers are employed.

From the foregoing it will be seen that a large number of apertured disks can be produced in a comparatively short time and without the employment of skilled labor.

Having thus described my invention, I claim as new and desire to secure by Letters Patent—

1. A machine for producing an apertured disk from a piece of wood, provided with a revoluble cutter-head for cutting the disk from the piece of wood, a vertically-movable boring device arranged below the cutter-head for boring a central aperture in the disk, and a presser device within the cutter-head and acting on the wood within the marginal line of the disk and on the side opposite the one from which the boring takes place, the presser device being in alinement with the boring device and hollow to receive the end of the boring device on cutting through the piece of wood, as set forth.

2. A machine for producing apertured disks, comprising a revoluble cutter-head for cutting a disk from a piece of wood, a vertically-movable and revoluble auger arranged below the cutter-head for boring a hole in the piece of wood and centrally in the disk, and a slidable presser device within the revoluble cutter, to press the piece of wood onto its supporting-table, the lower end of the presser device being recessed to receive the end of the auger on cutting through the piece of wood, as set forth.

3. A machine for producing apertured disks, comprising a revoluble cutter-head for cutting a disk from a piece of wood, a vertically-movable and revoluble auger arranged below the cutter-head for boring a hole in the piece of wood and centrally in the disk, and a slidable presser device within the revoluble cutter, to press the piece of wood onto its supporting-table and on the side of the piece of wood opposite the one on which the boring by the said auger begins, the lower end of the presser device being recessed and having openings in its sides, as set forth.

4. A machine for producing apertured disks from a piece of wood, consisting of a disk-cutting device, a boring device arranged opposite the cutter-head and operating on the piece of wood on the side opposite the one on which the disk-cutting device operates, to form a central aperture in the disk, the said devices being in axial alinement with each other, and means for holding the piece of wood against movement during the cutting and boring operation, the said means comprising a movable table through which passes the boring device and a presser-bar slidable within the cutting device and having a recess in its end for the reception of the end of the boring device, as set forth.

5. A machine for producing apertured disks from a piece of wood, comprising a revoluble disk-cutting device, a revoluble boring device in axial alinement with the said disk-cutting device, and operating on the piece of wood on the side opposite the one on which the cutting device operates, a movable feed-table carrying the piece of wood to be operated on simultaneously by the said cutting and boring devices, means for feeding the table to feed the piece of wood to the cutting device, and means operated by the movement of the table for feeding the said boring device to the piece of wood, as set forth.

6. A machine for producing apertured disks from a piece of wood, comprising a revoluble disk-cutting device, a revoluble boring device in axial alinement with the said disk-cutting device, a vertically-movable feed-table carrying the piece of wood to be operated on simultaneously by the said cutting and boring devices, means for feeding the table to feed the piece of wood to the cutting device, and means controlled by the movement of the table for feeding the said boring device to the piece of wood and at a speed exceeding that of the table feed, as set forth.

7. A machine for producing apertured disks from a piece of wood, comprising a revoluble disk-cutting device mounted to revolve in a fixed support, a revoluble boring device in axial alinement with the said disk-cutting device and operating on the piece of wood on the side opposite the one on which the cutting device operates, a vertically-movable feed-table carrying the piece of wood to be operated on simultaneously by the said cutting and boring devices, means for feeding the table to feed the piece of wood to the cutting device, means controlled by the movement of the table for feeding the said boring device to the piece of wood, and means for counterbalancing the said feed-table, as set forth.

8. A machine for producing apertured disks from a piece of wood, comprising a disk-cutting device mounted to revolve in a fixed support, a revoluble boring device in axial alinement with the said disk-cutting device, a movable feed-table carrying the piece of wood to be operated on simultaneously by the said cutting and boring devices, means for feeding the table to feed the piece of wood to the cutting device, means for feeding the said boring device to the piece of wood and at a speed exceeding that of the table, and a presser device mounted to slide centrally within the disk-cutting device and engaging the piece of wood as the latter is fed to the disk-cutting device, as set forth.

9. A machine for producing apertured disks from a piece of wood, comprising a disk-cutting device mounted to revolve in a fixed support, a revoluble boring device in axial alinement with the said disk-cutting device, a movable feed-table carrying the piece of wood to be operated on simultaneously by the said cutting and boring devices, means for feeding the table to feed the piece of wood to the cutting device, means operated by the movement of the table for feeding the said boring device to the piece of wood, and a presser device mounted to slide centrally within the disk-cutting device and engaging the piece of wood as the latter is fed to the disk-cutting device, the presser device being recessed for the entrance of the boring device as the latter cuts through the piece of wood, as set forth.

10. A machine for producing apertured disks from a piece of wood, comprising a disk-cutting device mounted to revolve in a fixed support, a revoluble boring device in axial alinement with the said disk-cutting device, a vertically-movable feed-table carrying the piece of wood to be operated on simultaneously by the said cutting and boring devices, means for feeding the table to feed the piece of wood to the cutting device, means operated by the movement of the table for feeding the said boring device to the piece of wood, and a weighted presser-bar having its end recessed for the entrance of the boring device, the said presser-bar being centrally slidable in the disk-cutting device, as set forth.

11. A machine for producing apertured disks from a piece of wood, comprising a disk-cutting device mounted to revolve in a fixed support, a revoluble boring device in axial alinement with the said disk-cutting device, a vertically-sliding feed-table carrying the piece of wood to be operated on simultaneously by the said cutting and boring devices, means for feeding the table to feed the piece of wood to the cutting device, a slide carrying the boring device, means operated from the table for operating the slide, and a weighted presser-bar having its end recessed for the entrance of the boring device, the said presser-bar being centrally slidable in the disk-cutting device and the piece of wood as the latter is fed to the disk-cutting device, as set forth.

12. A machine for producing apertured disks, comprising a revoluble cutter-head for cutting the disks, a revoluble auger for boring a central aperture in the disk and arranged in axial alinement with the cutter-head, a feed-table for the wood, means for feeding the table toward the said cutter-head, a feed-slide carrying the said auger and mounted to slide on the feed-table, and means for imparting a sliding motion to the said feed-slide at a speed exceeding that of the feed-table, as set forth.

13. A machine for producing apertured disks, comprising a revoluble cutter-head for cutting the disks, a revoluble auger for boring a central aperture in the disk and arranged in axial alinement with the cutter-head, a feed-table for the wood, means for feeding the table toward the said cutter-head, a feed-slide carrying the said auger and mounted to slide on the feed-table, and means for imparting a sliding motion to the said feed-slide at a speed exceeding that of the feed-table, the said means being controlled by the feed-table, as set forth.

14. A machine for producing apertured disks, comprising a revoluble cutter-head for cutting the disks, a revoluble auger for boring a central aperture in the disk and arranged in axial alinement with the cutter-head, a feed-table for the wood, means for feeding the table toward the said cutter-head, a feed-slide carrying the said auger and mounted to slide on the feed-table, and means for imparting a sliding motion to the said feed-slide, at a speed exceeding that of the feed-table, the said means consisting of a rack on the auger-feed slide, a gear-wheel journaled on the feed-table and moving bodily with the same, and a fixed rack in mesh with the said gear-wheel, as set forth.

15. A machine for producing apertured disks, comprising a revoluble cutter-head for cutting the disks, a revoluble auger for boring a central aperture in the disk and arranged in axial alinement with the cutter-head, a feed-table for the wood, means for feeding the table toward the said cutter-head, a feed-slide carrying the said auger and mounted to slide on the feed-table, means for imparting a sliding motion to the said feed-slide at a speed exceeding that of the feed-table, a counterbalancing device for the feed-table and a counterbalancing device for the feed-slide, as set forth.

16. A machine for producing apertured disks, comprising a revoluble cutter-head for cutting the disks, a revoluble auger for boring a central aperture in the disk and arranged in axial alinement with the cutter-head, a feed-table for the wood, means for feeding the table toward the said cutter-head, a feed-slide carrying the said auger and mounted to slide on the feed-table, means for imparting a sliding motion to the said feed-slide at a speed exceeding that of the feed-table, a counterbalancing device for the feed-table, and a counterbalancing device for the feed-slide and supported on the feed-table, as set forth.

17. A machine of the class described, having a feed-table mounted to slide, a feed-slide mounted to move on the sliding table and carrying a rack, a fixed rack, and a gear-wheel journaled on the sliding table and in mesh on opposite sides with the said racks, as set forth.

In testimony whereof I have signed my name to this specification in the presence of two subscribing witnesses.

GEORGE A. ENSIGN.

Witnesses:
GEORGE W. DEATRICK,
JOS. BAUER.